(12) United States Patent
Wabyick et al.

(10) Patent No.: US 9,600,447 B2
(45) Date of Patent: Mar. 21, 2017

(54) METHODS AND SYSTEMS FOR PAGE LAYOUT USING A VIRTUAL ART DIRECTOR

(75) Inventors: Daniel Wabyick, San Francisco, CA (US); Justin Van Slembrouck, Bronx, NY (US)

(73) Assignee: Adobe Systems Incorporated, San Jose, CA (US)

( * ) Notice: Subject to any disclaimer, the term of this patent is extended or adjusted under 35 U.S.C. 154(b) by 1645 days.

(21) Appl. No.: 12/325,344

(22) Filed: Dec. 1, 2008

(65) Prior Publication Data
US 2014/0250371 A1    Sep. 4, 2014

(51) Int. Cl.
*G06F 17/00* (2006.01)
*G06F 17/21* (2006.01)

(52) U.S. Cl.
CPC .................................. *G06F 17/21* (2013.01)

(58) Field of Classification Search
CPC .................................................... G06F 3/0481
USPC .......................................................... 715/243
See application file for complete search history.

(56) References Cited

U.S. PATENT DOCUMENTS

| | | |
|---|---|---|
| 5,510,808 A | 4/1996 | Cina et al. |
| 5,943,052 A | 8/1999 | Allen et al. |
| 5,973,663 A | 10/1999 | Bates et al. |
| 6,157,381 A | 12/2000 | Bates et al. |
| 6,191,785 B1 | 2/2001 | Bertram et al. |
| 6,590,594 B2 | 7/2003 | Bates et al. |
| 6,738,084 B1 | 5/2004 | Kelley et al. |
| 7,415,666 B2 | 8/2008 | Sellers et al. |
| 7,490,297 B2 | 2/2009 | Bates et al. |
| 7,568,154 B2 * | 7/2009 | Salesin et al. ................ 715/243 |
| 7,574,669 B1 | 8/2009 | Braun et al. |
| 7,619,616 B2 | 11/2009 | Rimas et al. |
| 2005/0091254 A1 | 4/2005 | Stabb et al. |
| 2005/0097474 A1 | 5/2005 | Accot |

(Continued)

FOREIGN PATENT DOCUMENTS

JP    2003330700    11/2003

OTHER PUBLICATIONS

Sherrod, A. "Data Structures for Game Developers". 2007. pp. 1-7.*

(Continued)

*Primary Examiner* — Shawn S Joseph
(74) *Attorney, Agent, or Firm* — Kilpatrick Townsend & Stockton LLP

(57) ABSTRACT

A layout manager can generate a layout for displaying a plurality of content units in a display area using a layout strategy, with the layout strategy specifying a layout design rule. The generated layout can indicate a position in the display area for the plurality of content units. In some embodiments, the design rule(s) may in effect "codify" traditional graphic design principles. When the layout is generated, the content units can be placed into a display area of a page and then the layout can be checked against at least one design rule and the layout adjusted as needed to meet the design rule. The system can comprise a user interface module that renders the content units in the display area using the generated layout. In some embodiments, content units are placed into a layout on a one-by-one basis according to priority, available display space, and one or more design rules.

2 Claims, 11 Drawing Sheets

(56) References Cited

U.S. PATENT DOCUMENTS

| | | |
|---|---|---|
| 2006/0253795 A1 | 11/2006 | Titov et al. |
| 2008/0120534 A1* | 5/2008 | Moore .......................... 715/243 |
| 2009/0070707 A1 | 3/2009 | Schaller et al. |
| 2010/0162161 A1 | 6/2010 | Lin et al. |

OTHER PUBLICATIONS

Office Action dated Feb. 10, 2011 in U.S. Appl. No. 12/325,337.
Using Adobe® Buzzword®, Chapter 2: How do you use Adobe Buzzword? Title page, Copyright page, pp. iii, 1-14, chapter 3: Buzzword tips, pp. 15-26 Copyright 2001-2008 Adobe Systems Incorporated http://help.adobe.com/en_US/Acrobat.com/buzzword/buzzword_help.pdf (last accessed Oct. 16, 2008).
The New York Times Member Center, Frequently Asked Questions, 7 pages (2008) http://www.nytimes.com.membersenter/faq/timereader.html (last accessed Dec. 1, 2008).
Office Action dated Jul. 11, 2011 in U.S. Appl. No. 12/325,337.
Notice of Allowance dated Feb. 17, 2012 in U.S. Appl. No. 12/325,337.
U.S. Appl. No. 13/481,818 , "Notice of Allow ance", mailed Sep. 9, 2015, 6 pages.
Appert et al., "OrthoZoomScroller: 1 D Multi-Scale Navigation", Montreal Canada, [online] Retrieved fromthe Internet: <URL: http://doi.acm.org/1 0.1145/1124772.1124776> (2006).
Cockburn et al., "Faster Document Navigation w ith Space-Filling Thumbnails", Montreal Quebec, Canada, ACM 1-59593-178-3/06/0004 (Apr. 22-28, 2006).
Final Office Action from related U.S. Appl. No. 13/481,818 dated May 28, 2015, 7 pages.

\* cited by examiner

METHODS AND SYSTEMS FOR PAGE LAYOUT USING A VIRTUAL ART DIRECTOR

TECHNICAL FIELD

The disclosure below generally relates to rendering visual representations of content, particularly arranging content units in a display area.

BACKGROUND

Numerous software applications are used to visually represent data obtained from local or remote sources. For example, word processors, publishing tools, and web browsers may include layout management components that aid in rendering views of data such as text and pictures in a document. A web browser may, for example, provide an inline view where the text and pictures set forth in HTML or other data are rendered in the order in which they are specified in the HTML (or other data). As another example, data may include markup notations to identify different parts of a document and specify guidelines for positioning those parts.

In contrast to traditional publishing, where the available area for displaying content is known, publishers of electronic content may not always know the size of the area in which content will be displayed. For example, a newspaper publisher may desire to place content online in a manner so that the content as displayed will approximate the signature layout characteristics of the physical newspaper. This goal may be frustrated by the fact that users can, for example, resize the window in a browser or other display tool. As another example, users may view online content using a variety of devices each having different display sizes and/or resolutions.

Some document display tools, such as certain web browsers and newspaper reader applications, rely on templates for controlling where elements are placed in different display scenarios (e.g., different templates for different devices or available display areas). However, templates may not always be an ideal solution. For example, each template must be designed for use in a particular scenario, which requires time and effort. Another possible issue with templates is that a template for a particular display scenario may not be available and so content may be displayed in a non-ideal manner using the "best available" template. For instance, a template may be specified for a given screen size, but if the user resizes the screen or window, the appearance of the content may be disrupted. Alternatively, the user could be "locked out" of certain actions or restricted to certain display characteristics, and this may create an undesirable user experience.

SUMMARY

A computer system can comprise a layout manager that generates a layout for displaying a plurality of content units in a display area using a layout strategy, with the layout strategy specifying a layout design rule or rules specifying an acceptable appearance of a page (or pages). The generated layout can indicate a position in the page for the plurality of content units. The layout can be checked against at least one design rule and adjusted as needed to meet the design rule. The system can comprise a user interface module that renders the content units in the display area using the generated layout. The display area may comprise one or more pages, with the number of pages determined at the time of display based on how the layout proceeds in light of the available content and design rule(s).

A computerized method can comprise accessing data identifying a plurality of individualized content units to be displayed and generating a layout specifying a position in a display area for the individualized content units, the layout generated so as to meet a set of design rules setting forth parameters specifying an appearance of a page (or pages).

Embodiments include computer-readable media embodying program code executable by a computer system. The media can comprise program code for: accessing a plurality of content units and determining a priority for each unit; determining an amount of available display area; and placing content units into a layout. Each content unit can be placed into the layout by using a design rule specifying the ultimate desired appearance of the document to determine the position of the content unit in light of the available display area when the content is placed into the layout, with the content units placed into the layout one at a time in order of priority.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Figure 1:
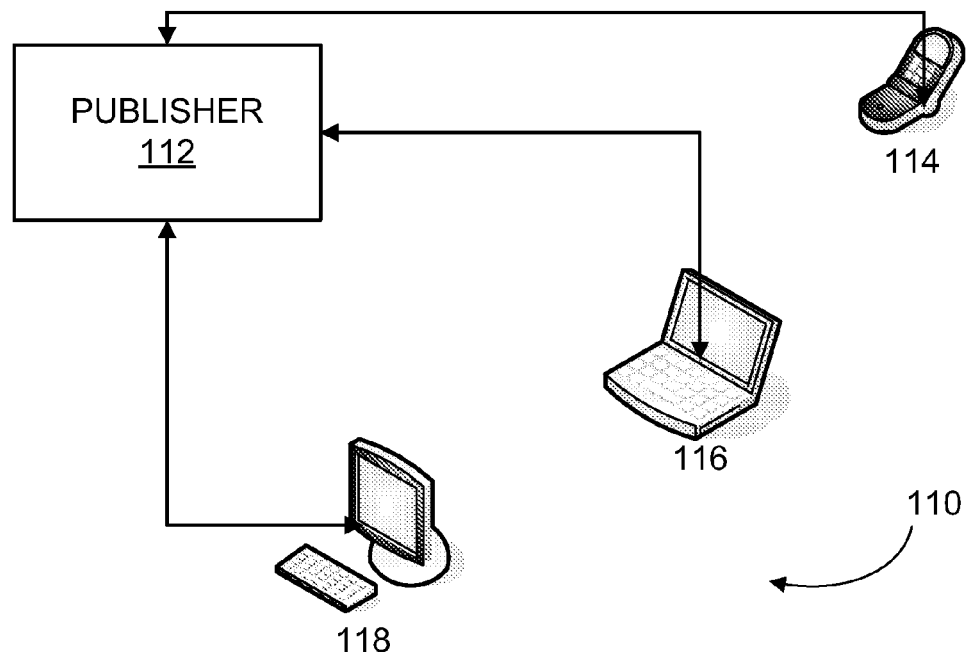
FIG. 1 shows an exemplary system for providing content to a plurality of display devices.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

A computer system can comprise a plurality of functional units provided by software and/or hardware. The units can include, for example, a layout manager and a user interface module provided as part of a news reader. Rather than using a static template determined at a predetermined time, the layout manager can generate a layout for displaying a plurality of content units in a display area using a layout strategy that specifies one or more layout design rules.

The layout strategy may specify design rules regarding the ultimate desired or acceptable appearance of the document (i.e. one or more appearance characteristics of a page or pages of the document), rather than the specific parameters directly controlling the placement of content as would be found in a template. For example, the news reader may use layout design rules to approximate the decisions made in laying out pages of a newspaper, magazine, or other publication. The design rules can be derived by codifying "traditional" graphic design principles that may, for instance, be considered by an art director laying out content for a given space. The design rules can specify conditions for relative placement of content units within a page based on evaluating content unit characteristics.

The layout determined using the rules can indicate a position in the display area for the plurality of content units so that the content-as-displayed meets some or all of the design rules in a given display scenario. Thus, the display can be treated as a "page," with the layout determined dynamically (i.e. at time of display) based on characteristics of the content to be displayed and information about the current display scenario so that the layout meets the design rule(s). When a display scenario changes, such as when a display area is defined or redefined (e.g., a window resize), a new layout can be generated for determining where and how individualized units of the content are to be displayed based on the new "page" size corresponding to the available display area.

In some embodiments, the same design rule or rules can control placement for the same content independently of display scenarios, which are evaluated on a case-by-case basis in light of the design rule(s). This can allow a publisher to define design rules once, rather than creating numerous templates that specifically govern how particular units of content will be placed in given display scenarios (e.g., different templates for different devices).

As one example, the layout strategy may include design rules for determining a number of available columns in a display area based on desired column appearances. Individualized units of the content to be displayed may be placed in certain columns and certain column positions based on additional design rules of the layout strategy and content characteristics. For example, a narrow display area may use smaller or no images and may allocate content across multiple pages.

In some embodiments, the layout process can include a feedback component where an overall layout is evaluated before being displayed and adjustments to the layout are made in order to more closely meet the rules of the layout strategy, if possible. For example, the design rules may provide that each content unit is to occupy a single page—that is, if a content unit would exceed the available area of the page, it will be resized, the content unit will be moved to another page, and/or other content unit placement or size characteristics may be adjusted. In some embodiments, a page's size corresponds to the size of the display area.

The user interface module can render the content units in the display area using the determined layout. The computer system may include an output management module that outputs the content units in a format depicting the content units as rendered in the display area. For example, outputting the content units in such a format can include providing a file that depicts the content units as rendered (e.g., a PDF) and/or printing a representation of the display area.

The computer system can include a data access module that interfaces with a data source and obtains the plurality of content units. As one example, interfacing with a data source and obtaining the plurality of content units can comprise accessing an XML feed comprising a plurality of stories, each story comprising text and at least some stories referencing an image such as a photo, chart, or other graphic element. The system may maintain a local copy of the content units to allow for offline browsing of content, such as offline browsing of an electronic newspaper, magazine, or other publication.

The layout manager can support the use of multiple layout strategies. For example, the layout manager may be configured to select the layout strategy based on the source of the content units. As another example, a user may specify a layout strategy to use if the layout manager comprises a component in a publishing or design tool. As a further example, a set of layout strategies may be provided alongside content units arranged into different organizational units of a publication, such as content units associated with different sections of an online newspaper. Layout strategies may be used to allow browsing of different publications using the same display tool or publishing content by choosing an 'Art Direction' for a publishing tool.

The generalized examples discussed above are followed below by several particular examples of embodiments of the present subject matter.

FIG. 1 shows an exemplary system 110 for providing content to a plurality of display devices. This example depicts a publisher 112 in communication with display devices 114, 116, and 118. A display device may be in communication with more than one publisher 112 at a given time. For example, a display device may access data from a publisher over the Internet or via a proprietary network connection using wired, wireless, and/or other links. Publisher 112 may, for example, represent a newspaper publisher or online content provider that desires to provide content for display in numerous different display scenarios. As used herein, a "display scenario" refers to the particular conditions under which content will be displayed. A display scenario may be determined in part based on the type of device that will display content.

FIG. 1 illustrates several different types of devices. For example, computing device 114 may comprise a device with a relatively small display area, such as a mobile phone, persona digital assistant (PDA), music player, or the like. On the other hand, computing device 116 may represent a laptop or tablet computer with a larger display area. Computing device 118 may represent a desktop computer with a large, high-resolution display. Other examples of a computing device include portable reading devices (e.g. "e-book readers") and televisions (e.g., using a "set top box").

The resulting display scenario for each device may be quite different in at least some circumstances. For example, mobile device 114 may have a much smaller display area than computing device 118. The devices may differ in other aspects including, but not limited to, hardware resources (e.g. memory, processor speed), operating system, and network connection availability/bandwidth.

Figure 2:
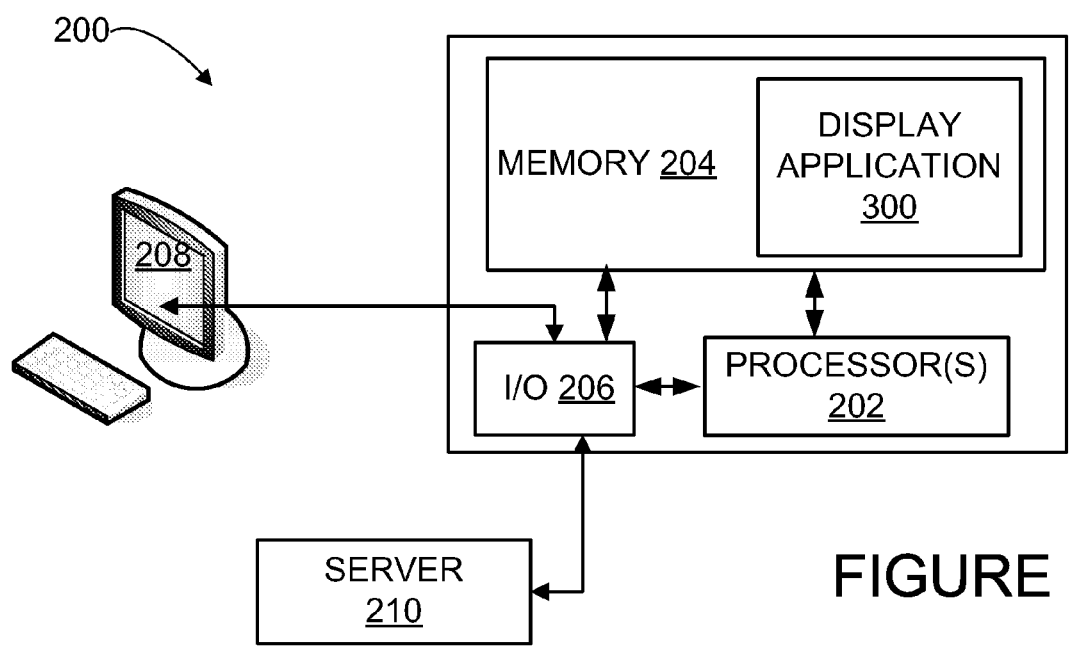
FIG. 2 shows an exemplary display device in closer detail.

FIG. 2 shows an example of a computer system 200 that may provide embodiments of a scrollbar. For instance, computer system 200 may correspond to one of devices 114, 116, or 118 from FIG. 1, for example. Computer system 200 comprises one or more processors 202 which execute instructions accessed from memory 204. A display tool 300 or publishing tool 400 as noted below may comprise instructions stored in memory 204 and may reside in memory 204 when executed. The scrollbar may be displayed based on application-specific code or may be an element of another component such as an operating system and may be used along with other interface components to control how display application displays content.

Figure 3:
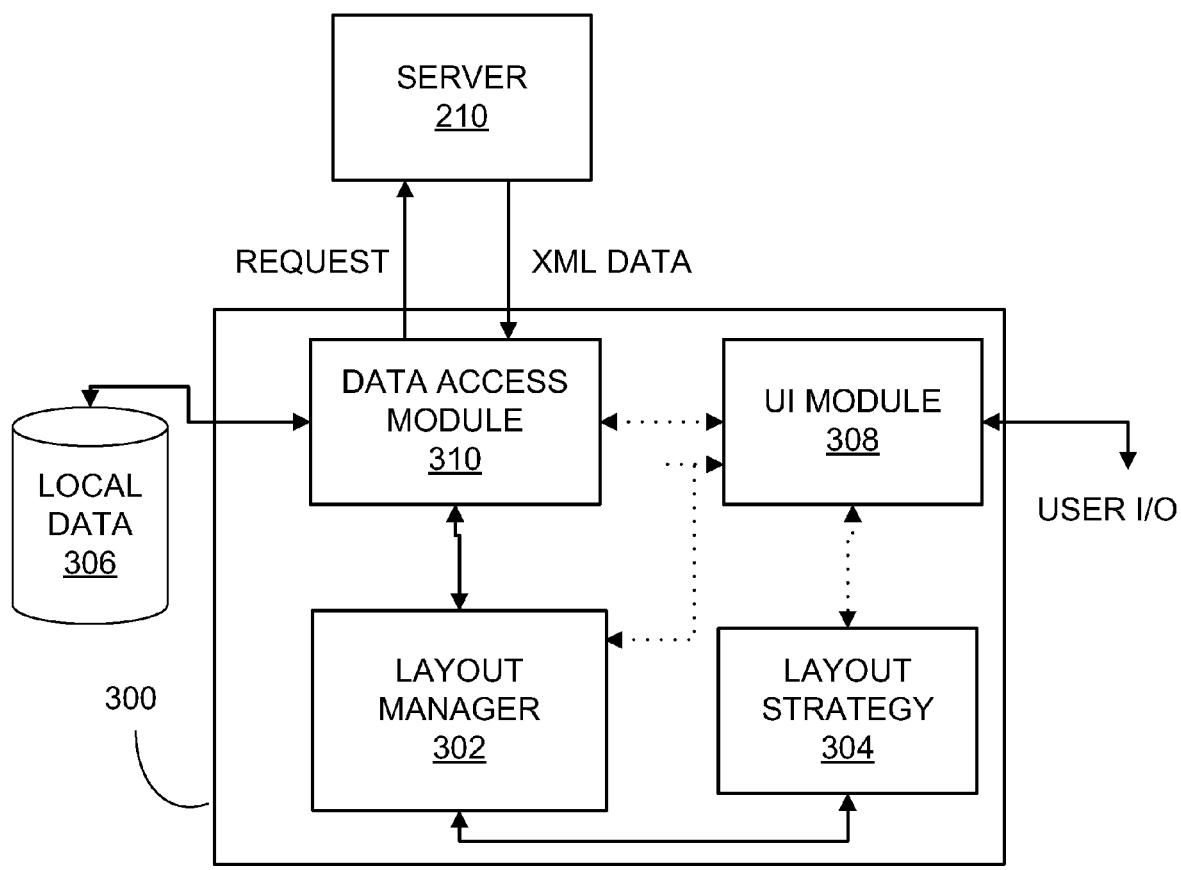
FIG. 3 is a block diagram illustrating exemplary components of a display tool in communication with a data source.

I/O components 206 are used to interface with a keyboard and monitor 208 in this example to receive user input and provide output. I/O components 206 are also operative to communicate with a server 210 to obtain content for display application 300 to display, although such content could be locally sourced. Additionally, I/O components 206 could be used to access additional memory, remote storage, or other resources FIG. 3 is a block diagram illustrating exemplary components of a display tool 300 in communication with a data source (in this example, a server 210) that provides content from a publisher 112. For example, display tool 300 may access server 210 over the Internet. Although the examples discussed herein relate to displaying a document comprising data from a single source, it will be understood that the teachings herein are not limited and could be adapted for use when displaying a document comprising content from multiple sources (e.g., data from different data feeds displayed in a single document). Display tool 300 may comprise, for example, a news reader, a browser application, or other application used to view online and/or offline content.

In this example, display tool 300 comprises a plurality of modules provided by a computer system. The modules include a layout manager 302 for controlling placement of individualized content units based on a layout strategy 304. Layout strategy 304 may be maintained locally or may be obtained from server 210 along with the content to be displayed (or could be obtained from another source). In this example, the individualized content units are retrieved from a local store 306 and are displayed by a user interface module 308 that renders the individualized content units in a form for consumption by one or more users based on layout decisions made by layout manager 302.

In this example, display tool 300 obtains content by way of data access module 310. Data access module 310 is operative to send a request 32 to server 210 and receive XML data 34 in response using networking components of computing device 19. Data access module 310 maintains some or all of the received data in local data store 24. This may advantageously allow for a user to browse content in an offline mode (e.g., when no network connection is desired or available).

Figure 4:
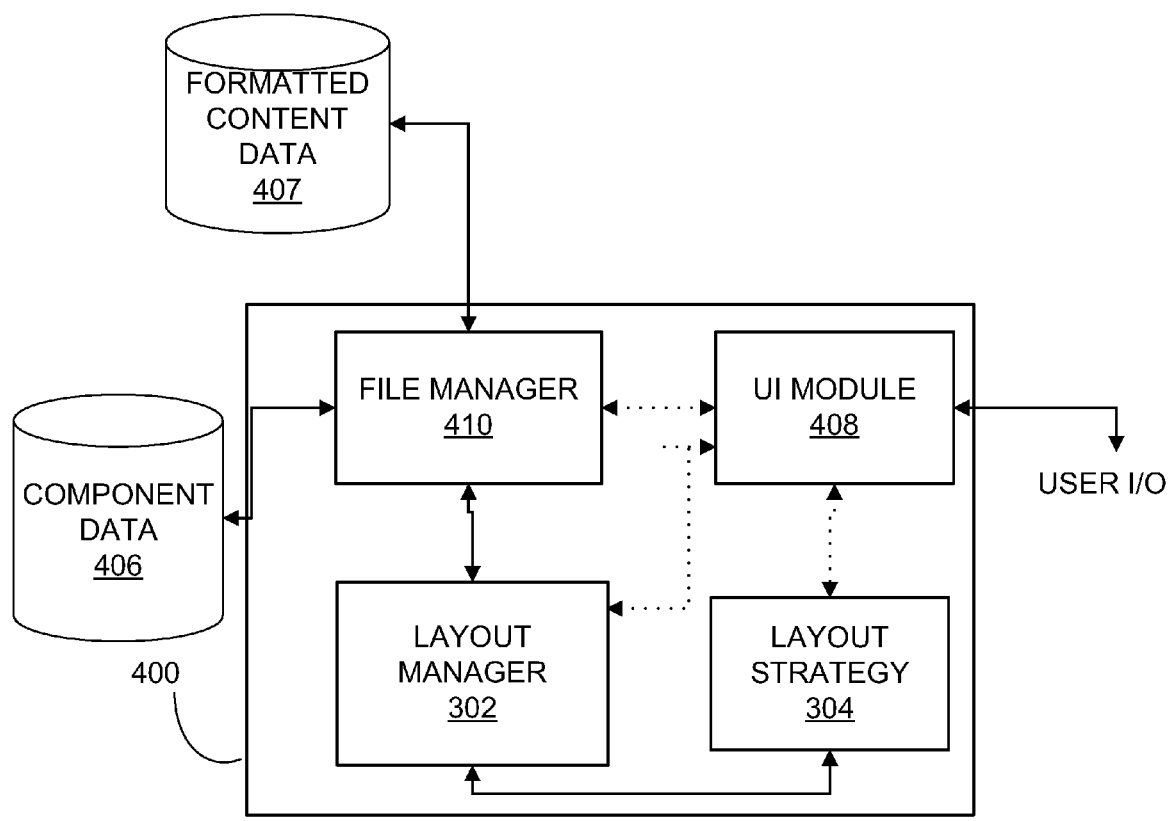
FIG. 4 is a block diagram illustrating exemplary components of a publishing tool.

Although the layout management techniques discussed herein may be suitable for use in display of content from online sources, the techniques are applicable regardless of source. FIG. 4 illustrates an example of a publishing tool 400 that also includes a layout manager 302 relying on a layout strategy 304. Publishing tool 400 is provided via a computer system as above, but, the content to be laid out is not obtained from a separate publisher.

Publishing tool 400 may use the layout techniques discussed herein for laying out word processing documents, desktop publishing documents, or other documents. Content comprising component units to be laid out is obtained from file store 406 via file manager 410 and/or may be provided via UI module 408 (e.g., a user inputs text, creates or imports artwork, etc). File store 406 may represent a drive or other resource available to publishing tool 400, although the document(s) to be published could be obtained from a network resource.

In this example, file manager 410 is further operative to output the content units in a format depicting the content units as rendered in the display area. For example, file manager 410 may output published document files to file store 407 holding formatted content data (e.g., PDF or other files representing a page as rendered onscreen or as printed). File store 407 could be the same as file store 406 (e.g., a desktop publishing file may be opened and edited and/or the final product may be stored at the same location as the source of the content). File manager 410 or other suitable components could also output published content in one or more forms such as by printing the laid-out content. The display area can correspond to the area available for printing. Output functionality such as printing may be supported in display tool 300 of the prior example, as well.

As an example, a user may specify content units to be included in a newspaper, newsletter, memorandum, brochure or another type of document by dragging content units such as text and images into a workspace. For example, word processor documents and image files could be dragged or copied-and-pasted into an onscreen area. As another example, a user may specify content units to be included in a web page.

The user could then provide additional information about the content units (e.g., prioritizing units, linking images to particular text units) via a dialog or other suitable interface(s) and select an "Art Direction" corresponding to a layout strategy for use in laying out the content units. The publishing tool may allow the user to define and/or edit design rules of the layout strategy.

In some embodiments, display tool 300 and/or publishing tool 400 can be implemented in software as a plurality of software modules. For instance, a software tool may be implemented for execution using the ADOBE® AIR® or FLASH® runtime environment (both available from Adobe Systems, Inc. of San Jose Calif.). This may, for example, allow for cross-platform capability since display tool 300 and/or publishing tool 400 could be implemented once, with the details of different device environments (e.g. different operating systems) handled by the execution environment. Other suitable execution environments allowing such cross-platform capability could be used.

Use of the same codebase running on a number of different devices via a common runtime environment may be advantageous for ensuring a desired appearance of published content. Since layout is determined dynamically based on a display scenario, there is no need for prior investigation of different potential device characteristics (e.g., available display area, display area aspect ratio) to optimize templates or display tool characteristics for different devices. Further, since layout is determined at the device that displays the content, a server or other device that provides the content units for display is not required to optimize the content for different device form factors.

Figure 5:
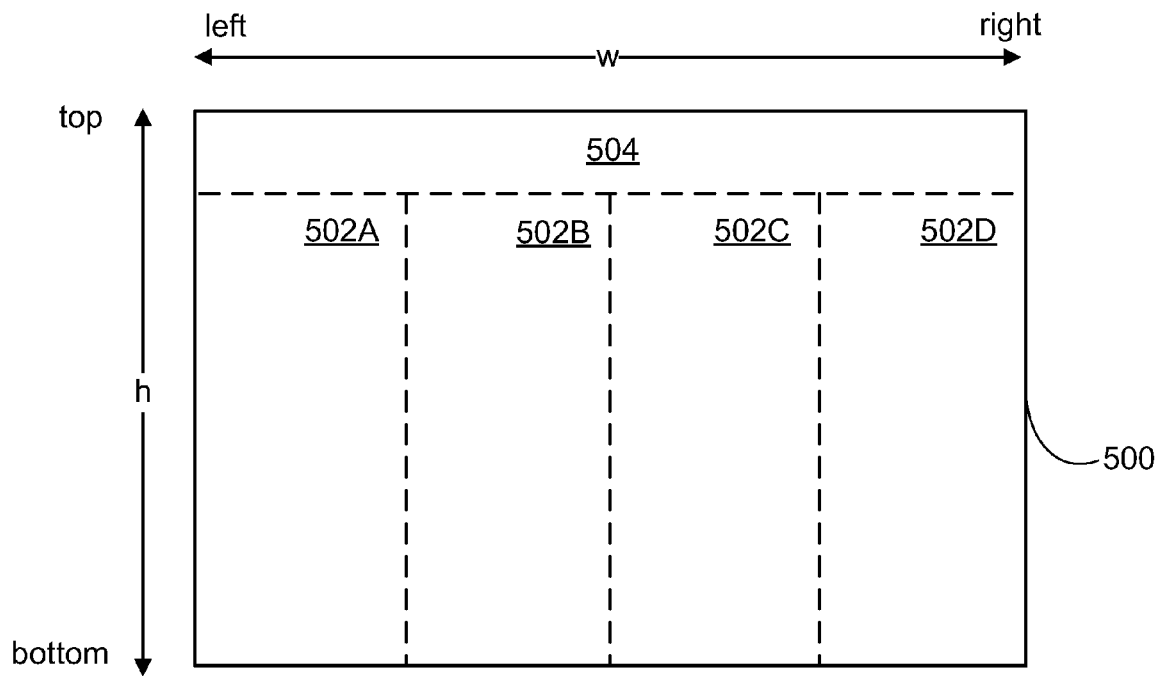
FIG. 5 is a block diagram illustrating an exemplary display area.

FIG. 5 is a block diagram illustrating an exemplary display area 500. In this example, display area 500 has a height h extending in the vertical direction (with the "top"

and "bottom" of display area 500 indicated) and a width extending in the horizontal direction (with the "left" and "right" sides of display area indicated). In this example, display area 500 has been divided into a plurality of columns 502 and a header area 504. In this particular example, display area 500 features four columns 502A, 502B, 502C, and 502D. Although "columns" and "header" are used in describing portions of display area 500, it will be understood that the teachings of the present subject matter can be applied regardless of the logical unit(s) used to refer to display area portions. For example, other layouts may be specified in terms of rows extending in the horizontal direction. When content is displayed using a layout, content units may be mapped to pixel coordinates.

In some embodiments, use of a layout can maximize the amount of content displayed in a particular display area while avoiding placement of a content unit in a display area so that the content unit extends outside the display area. For example, certain display tools (e.g., web browsers) provide horizontal and/or vertical scrollbars to change the content viewed in a display area when the content exceeds the display area. In contrast, certain embodiments of the methods and systems set forth herein divide content into discrete pages. That is, content units may be allocated across multiple pages of a layout based on design rules. This treatment can more closely approximate the experience of reading a physical document.

In some embodiments, the area of a page corresponds to the available display area. The design rules may provide that a given content unit (e.g., a story, an image, or a story and image together) may not span multiple pages or, if this is allowed, may provide rules for how to divide a content unit between pages.

Figure 6:
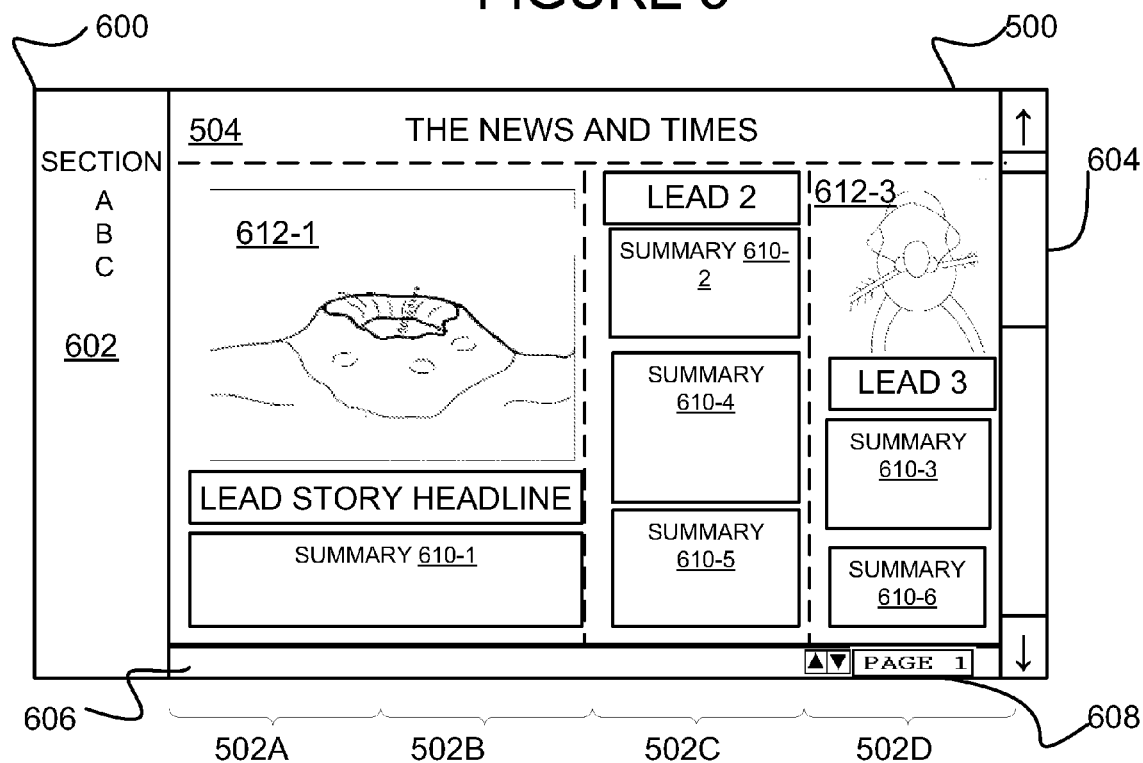
FIG. 6 is a block diagram illustrating an exemplary user interface displaying content in a display area.

FIG. 6 is a block diagram illustrating an exemplary user interface 600 displaying content in a display area 500. For example, user interface 600 may appear when an online newspaper is viewed using display tool 300 of FIG. 3 or when the newspaper is laid out using a publishing tool 400 of FIG. 4. In this example, display area 500 is rendered as part of a window and includes a section selection area 602 on its left side and a scroll bar 604 on its right side. For example, content units may be organized into sections (A, B, and C in this example). Additionally, a status bar 606 is featured at the bottom of display area 500 featuring a page interface 608 showing the current page and allowing a user to flip between pages using arrow buttons. The user may be able to input a desired page number in the page indicator box in some embodiments. Columns 502A, 502B, 502C, and 502D are indicated by brackets along the bottom of display area 500.

In this example, the content features the front page of a section of a fictional newspaper whose title, "The News and Times," is featured in header area 504. In this example, a plurality of individualized content units 610 and 612 are shown, with units 610 representing story text and units 612 representing pictures. Particularly, lead story text 610-1 with an accompanying headline "LEAD STORY HEADLINE" spans columns 502A and 502B, with a corresponding lead story photo 612-1 positioned above the headline. A second lead story 610-2 is positioned at the top of column 502C, and a third lead story 610-3 is positioned in column 502D with an accompanying photo 612-3 at the top of the column. The remainder of columns 502C and 502D are filled with text from non-lead stories 4, 5, and 6, labeled 610-4, 610-5, and 610-6, respectively.

User interface 600 may be rendered in response to layout decisions made by a layout management component configured in accordance with one or more aspects of the present subject matter. For example, stories 1-6 may be provided from the "News and Times" or its designee via an XML or other data feed. The data representing the stories may be divided into individualized content units—in this example, those units are story text and story photos, with a portion of the story indicated as a headline. Some stories may not include photos, and some stories may include multiple pictures. The pictures may be included directly in the data with the story text or may comprise identifiers (e.g., URLs) of where to obtain the pictures. In this example, the pictures are photographs, but a "picture" as used herein could refer to any graphical representation, including charts, graphs, and the like.

Additionally, in this example, the stories are provided so that the display tool rendering the stories has an indication of the relative priority of the stories. For instance, the stories may be presented in order of importance in the XML or other data feed. However, in other embodiments, a priority indicator could accompany each story or priority could be determined in another manner.

Because the stories are provided as individualized content units, the layout of the stories can be varied for different display scenarios based on a layout strategy. For example, the layout strategy may be provided with the stories or a desired layout strategy may be indicated in a data feed. In this example, the XML data specifying the stories divides the stories into discrete units and further indicates which part of a story is a headline, which part is a summary, and which part comprises story text. However, the present teachings could be employed in a system that divides content into discrete units on its own through suitable analysis techniques.

The content units and other items provided in interface 50 may be interactive. For example, if a user clicks or otherwise provides input indicating a particular headline, image, or summary, the full text of the accompanying story (or other content unit) may be displayed. A layout may be determined for display of the full text of the story. Additionally, the user may provide preference data such as preferred font size, data caching behavior, etc. The display tool may support user authentication, article purchase, and other functions as well.

Figure 7:
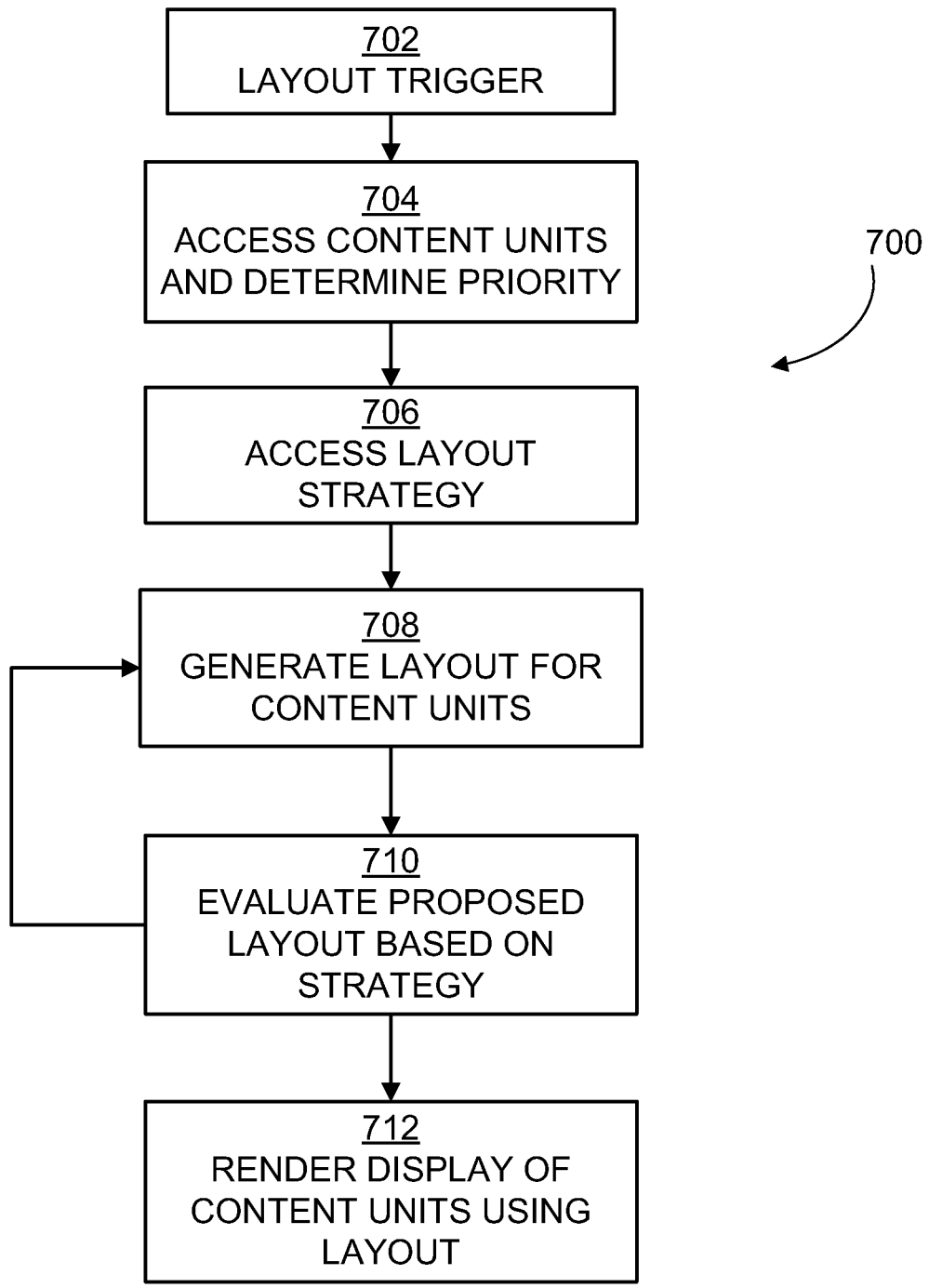
FIG. 7 is a flowchart showing an exemplary method for generating a layout based on a layout strategy

FIG. 7 is a flowchart showing an exemplary method 700 of generating a layout based on an layout strategy, and may be carried out by a layout manager 302 in a display tool, publishing tool, or other tool configured in accordance with aspects of the present subject matter. Block 702 represents the occurrence of a layout trigger. For example, a user may open a display tool, publishing tool, or other tool that uses a layout manager to determine placement of content. As another example, content may be divided into sections, chapters, or other logical units, and a layout may be determined each time that a different section, chapter, or other logical unit is selected. As a further example, generating a layout may be triggered when a display scenario changes, such as when the available display area changes due to a user resizing a window, adjusting resolution, or taking other action.

Block 704 represents accessing a plurality of individualized content units to be displayed and determining a priority for the units. Priority may be denoted and determined in any suitable way. Generally, the priority can be determined so that the layout manager can meaningfully apply priority-based design rules to the individualized display units to be laid out. In some embodiments, other characteristics of the content units in addition to or instead of priority can be used;

this will, of course, depend on the characteristics specified in the design rules governing placement of content units.

For example, the individualized display units may comprise stories for a publication, each story including text and some stories including graphics such as pictures. The stories may be arranged into a lead story or stories corresponding to the most important story(ies) and a plurality of remaining stories. For example, a publisher may denote the three most important stories as a first, second, and third lead story, while the remainder of stories are of secondary importance. The non-lead stories may be characterized further—for example, some may be secondary stories while others are tertiary stories. Tags in an XML or other data feed may be used to indicate priority in some embodiments. As another example, priority may be inferred from the order in which the stories are provided in a data feed.

Block 706 represents accessing a layout strategy comprising one or more layout design rules and accessing an available display area. The available display area can indicate the available space for rendering content. The available space can be specified in any suitable manner, although in some embodiments the display (or printing) area can be specified in pixels.

In contrast to a "template," a layout strategy does not specify where particular content units should be placed. Instead, a layout strategy comprises design rules setting forth how a given display scenario is to be treated (e.g., how a particular display area should be subdivided). Particular content units may be treated differently in light of the display scenario. For example, a content unit may include or may be associated with an image. The display may look different if the image is a portrait or landscape in some cases.

The design rules may comprise rules for handling special situations, such as when priority is not determinative for placing content units, how to handle excess display area, and how to handle error conditions. Further, the design rules may indicate how content units are to be treated based on information in addition to or instead of priority. For instance, a story with an accompanying photo or other graphical content may be treated differently than a story without graphical content. In some embodiments, layout strategies may be linked or composited for use in conjunction with one another. For example, a first layout strategy may include design rules for a first page of content and reference a different layout strategy for remaining pages. Those strategies may be linked in turn to strategies for viewing particular articles or other content units referred to in the pages.

Block 708 represents generating a layout for use in displaying the content units based on the layout strategy. Particular examples of generating a layout are discussed in further detail below. Generally, content units are "placed" into the layout—that is, a position for at least some of the content units can be determined using the design rules based on the priority and other characteristics of the content units. During placement, the remaining display area can be evaluated after each unit has been placed.

Additionally, generating a layout may comprise allocating the content units to multiple pages. For example, a given display area may not be large enough to display all available content units. A layout strategy may include one or more design rules governing how content units are to be allocated to the different pages. If multiple pages are to be used, then in some embodiments a layout for each page is determined in turn.

In some embodiments, text of content units may be rendered using a 'summary view' where some or all of the text will "reflow" to fit an available area. For example, the UI module of a design tool 300 or publication tool 400 may include an element that accesses textual data and format characteristics (e.g., font, size, etc.) and then renders the text to fit the display area allocated to the content unit. The content unit may include a taxonomy of formatted text paragraphs such as a headline, byline, dateline, and body. Use of a content unit exhibiting such behavior may be particularly difficult in conjunction with templates since the height of the content unit is unknown. The template, could of course, include a fixed height/width, but then the template would be "locked in" to a particular display area.

Block 710 represents step that may occur in some embodiment in which a layout position for each content unit is determined on a unit-by-unit basis. When all content units have been assigned a position (or when all available display area has been taken), the resulting proposed layout may be evaluated against one or more design rules to determine if any error conditions result. If so, then method 700 can loop back to 108 so that another layout can be determined. If multiple layouts corresponding to respective pages have been determined, the multiple layouts may be re-evaluated.

For example, a design rule may specify that a layout should fill a given percentage of available display area. A large display area may not be sufficiently filled by content units in an initial layout. The layout can be re-determined in light of the error condition using more content units and/or by expanding the amount of display area occupied by some or all of the content units to attempt to fill the display area. For example, an initial layout for a news publication may use only images, headlines, and story summaries. If too much space remains, then one or more summaries may be expanded and/or body text for some of the stories may be used to fill available space.

Block 712 represents rendering the content items using the determined layout. If multiple layouts have been determined, block 712 can comprise rendering one or more pages based on the respective layouts for each page. The pages may be rendered individually or simultaneously (for example if the user has indicated "view multiple pages" or another suitable setting).

For example, a user interface module may be used to display the text, graphics, and/or other portions of the content units on one or more display screens. As another example, the content items may be rendered in other media, such as by printing the text, graphics, and/or other portions. However, if the layout strategy is determined for a display area on a screen and the area available for printing differs, then a "print" command could comprise a layout trigger 102 for determining a different layout based on the area available for printing.

Figure 8:
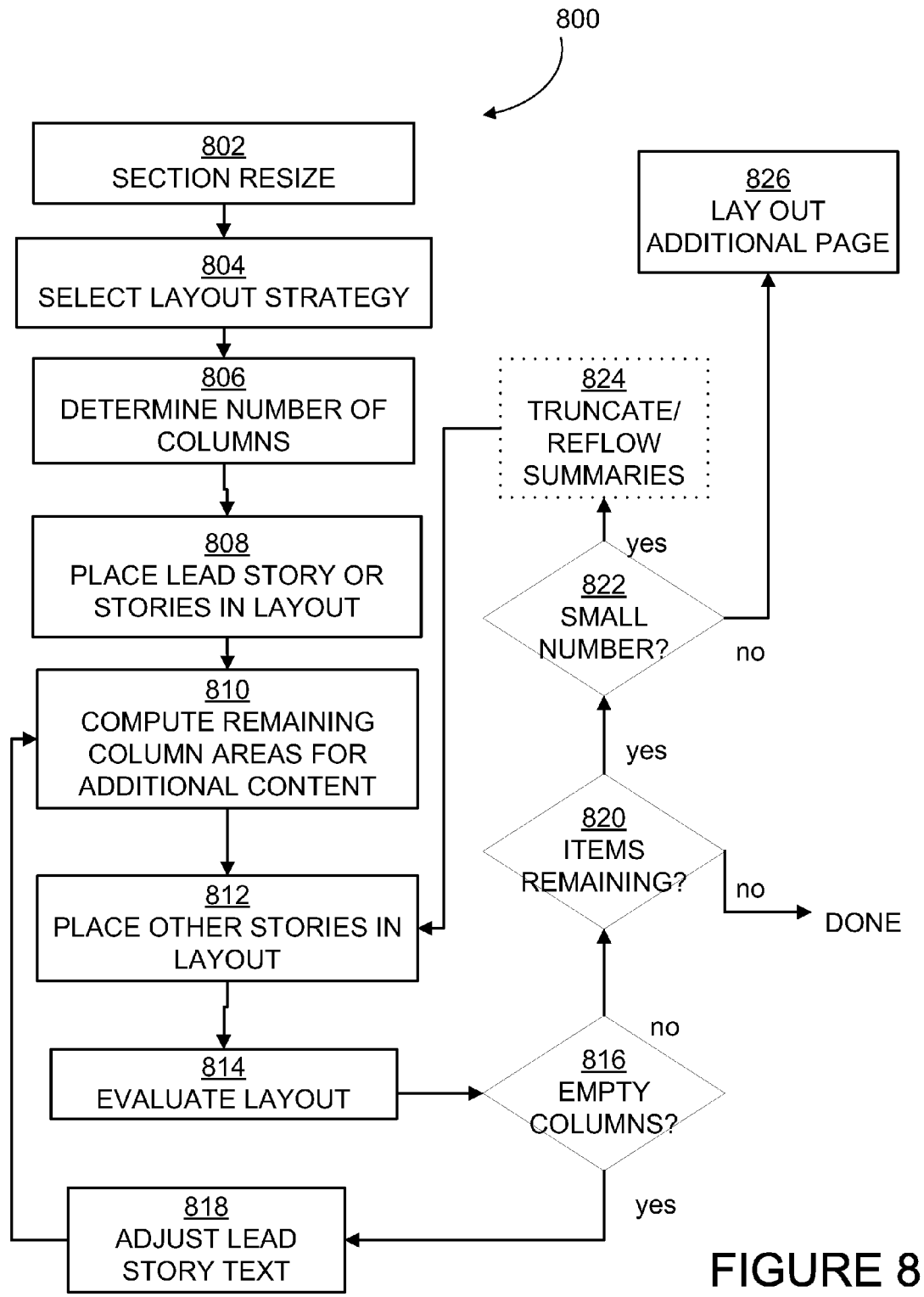
FIGS. 8, 9, and 10 illustrate aspects of an exemplary method for generating a layout in the context of laying out stories of an online publication.

FIG. 8 illustrates another exemplary method 800 of generating a layout in the context of laying out stories for an online news viewer such as shown in FIG. 5 which may be carried out, for example, by a layout manager. In this example, the layout strategy includes a number of design rules that are discussed in turn when the design rule(s) are relied upon at particular points in the layout determination process.

Block 802 represents a receiving a trigger for determining a new layout. In this example, a section resize command has been received. For example, a user may have provided input (e.g. a mouse gesture) resizing a display area for a particular section of a publication. As another example, the user may have selected a different section or opened a publication for viewing to trigger determining the layout.

Block 804 represents selecting a layout strategy. For example, multiple layout strategies may be available for the publication. For instance, different sections may have different layout strategies, the layout strategy may specify design rules for a first page of a given section and reference a different layout strategy for the remaining pages, and/or particular layout strategies may be provided based on other factors, such as a ratio of the number screen size to the number of content items involved in the layout. As another example, different strategies may be based on content types. For instance, the trigger may be selection of a particular article in a section and an appropriate article layout strategy for that section can be selected.

Block 806 represents determining the number of columns available for placing content units. A design rule may specify a minimum column width in terms of display area (e.g. pixels) or a relative measure, such as the number of words per column (this may allow the layout manager to accommodate user preferences such as text size and other characteristics).

Once the number of columns is determined, at block 808 the layout manager places the lead story or stories with accompanying graphics as appropriate. Exemplary details of placing the lead stories are discussed below with FIG. 9. Once the lead stories are placed, at block 810 the layout manager computes the remaining column areas for additional content.

Block 812 represents laying out the remaining stories based on one or more design rules. In this example, content units for the non-lead stories are placed with the assumption that the component(s) that display the content using the layout (e.g. UI module 308 or 408 of FIGS. 2-3) can adjust the display of a content unit to fit space allocated to the content unit. For example, the content unit may comprise an instance of a class that can adjust its own size to fit a given area (for example, at runtime each story or image may be represented by a respective object).

For example, story text may comprise formatted or tagged text units (e.g., paragraphs) specifying a headline, byline, dateline, and body. A story may comprise a summary, which may comprise the first few lines or sentences of body text or may be a separate element identified in the data. When a content unit is rendered, the summary text can be truncated to fill the area allocated to the summary or may be expanded to include some or all of the body text. Thus, "placing a summary" may result in display of most or all of the article if sufficient display area is allocated to it.

In some embodiments, the class or other logical representation of the content unit may reject a given height or width to intelligently truncate or expand its body text, summary text, or other portions. For a given display area, the representation of the content unit may return the next-closest display area(s) that will allow the content unit to properly expand or truncate. For example, a given display area may be rejected so that a line of text does not end in mid-sentence for example. As another example, a content unit representing an image may reject a given display area that distorts the image. Thus, when a content unit is placed in the layout for a given display area, it may return its actual display size which is then used in computing the available display area remaining.

In this example, stories are laid out in the remaining areas in a top-to-bottom and left-to-right and fashion. That is, the highest-priority story of the remaining stories is placed at the highest available area in a column starting from the left. The stories are placed into remaining spaces until no more stories or area remains. Stories may be placed to occupy one or more columns (i.e. "spanning" the columns). A design rule may govern when this treatment is appropriate or may prohibit this behavior entirely. For example, in some embodiments, a design rule may prohibit a summary from "breaking" across a column (i.e., a summary cannot begin in one column and continue at the top of another).

At block 814, the layout is evaluated. For example, the lead stories and summary units can be accessed to determine if they will fill their respective allocated areas. At block 816, the layout manager determines whether any empty columns remain. For example, the layout strategy can include a design rule specifying how to identify an "empty" column and whether such columns are ever allowed. In this example, if an empty column is found, the method loops to block 818, where the lead stories are adjusted to include body text to fill some or all of the empty space. Then, the method loops back to blocks 810 and 812 to place the remaining articles using summary flow.

If the resulting layout passes blocks 814 and 816, the layout manager checks at 820 to determine if any content units remain. If not, then the layout method ends and the layout is made available for use in rendering the content (e.g., by user interface module 308 or 408). If content items remain at 820, then they are treated appropriately based on the layout strategy. In this example, the layout strategy includes a design rule specifying treatment based on the remaining content units at block 822. If a small number (e.g., <3) units remain, then the method moves to block 824, which represents looping back to block 812 to resolve "orphans" by truncating and reflowing summaries. For example, block 824 may represent estimating the minimum area needed to accommodate the remaining units and specifying reductions in the area of the summary units to be used at block 812.

On the other hand, if at block 822 a large number of units remain, then the method moves to block 826, which represents selecting a suitable layout strategy and laying out another page. For example, the layout manager may select a layout strategy specified by a design rule for additional pages and use the layout strategy to carry out a variation of method 800 but beginning at block 806 and using the selected layout strategy for the next page.

Figure 9:
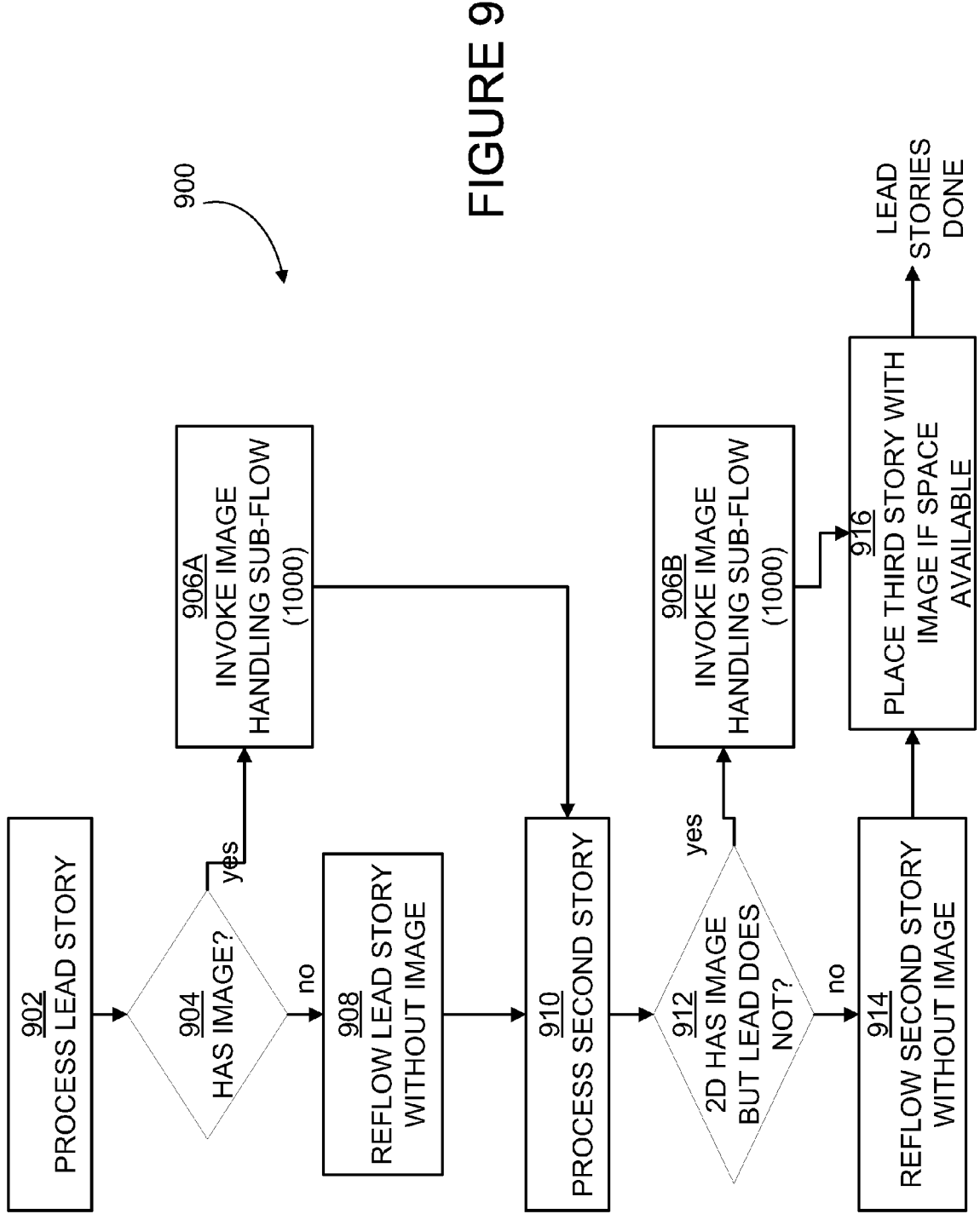

FIG. 9 is a flowchart illustrating one example of a method 900 for placing lead stories referenced in the example above. A publication may consider high-priority stories "lead" stories and give such stories special treatment for given sections. The particular design elements used for lead stories may be a signature characteristic of a publication and so specific design rules may be used to closely control how lead stories are treated in some embodiments.

Block 902 represents receiving a command to process one or more lead stories. In this example, three lead stories are processed and were recognized as lead stories by being the first three stories referenced in an XML data feed. Other indicators of priority may be used, of course. In any event, the true "lead" story (i.e., the first story) is evaluated first. At block 904, the method determines whether the first story has an image included in or referenced in its data. If so, then at block 906A, a sub flow for handling images is invoked. If the lead story does not include an image then at block 908 the lead story is reflowed without an image and placed into the layout. As noted above, some embodiments can use "reflow" whereby the story headline and summary can be displayed and truncated to occupy space made available to the story unit.

The lead story may be subject to particular design rules to emphasize its high priority. For example, when possible, the lead story may span multiple columns. Depending on the design rule(s), the text for the lead story may be presented across columns or may flow from the bottom of one column to the top of the next column. If an image is available, it may extend across the columns spanned by the lead story summary.

Block 910 represents processing the second story in light of the available space after placement of the first story (with or without an image). In this example, a design rule specifies that an image for a second story can be used if no image is available for the first story, but that an image for the second story will not be displayed if one is displayed for the first story. Thus, at block 912, the method determines whether the second story has an image and the first story does not. If that is the case, then block 906B represents invoking the subflow for handling stories with images.

If at block 912 the method determines not to use subflow 906, then the method moves to block 914, which represents reflowing the second story without an image. At block 916, once space has been allocated to the first and second stories, a third story is accommodated. In this example, the design rules specify that an image (if available) for the third story can be displayed if there are sufficient columns available for displaying the third story image spaced apart from the first story image by at least one column and without overpowering the image for the first story. For example, the image for the third story may not exceed a given fraction of the image for the first story.

Figure 10:
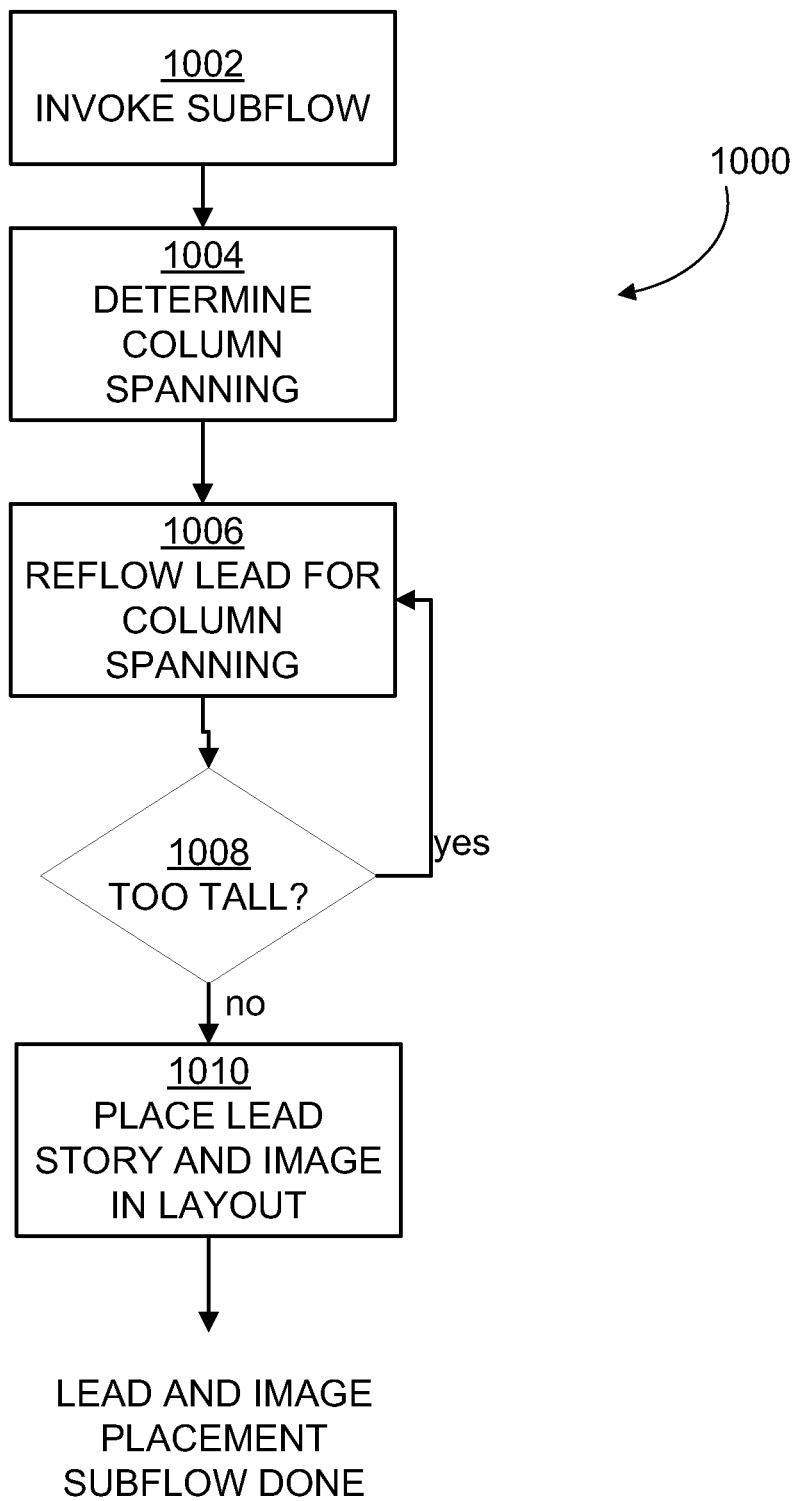

FIG. 10 illustrates an example of a subflow 1000 for handling stories with images invoked in the example of FIG. 9 at either 906A or 906B. The subflow can represent layout manager actions taken in light of specific design rules for images of lead stories. At 1002, the subflow is invoked with an indicator of the image to be used and an identifier of the story. In this example, the design rules specify that (i) a lead image and story should occupy the maximum number of columns up to half of the total columns available, (ii) the image height must not exceed the available height in the display area after accounting for a headline for the story, and (iii) an image can only span an even number of columns. Thus, at 1004 the subflow determines a maximum image width that can be used without distortion and then determines a maximum number of columns that can be spanned by the image before exceeding the maximum image width. At block 1006, the story is reflowed for the reduced number of columns. At block 1008 the subflow checks to determine if the lead story has become too tall (i.e. the image plus the story exceed the available amount of vertical space under the design rules), and the story is reflowed if so. At 1010, the subflow places the lead story in the layout and the subflow ends.

Figure 11A:
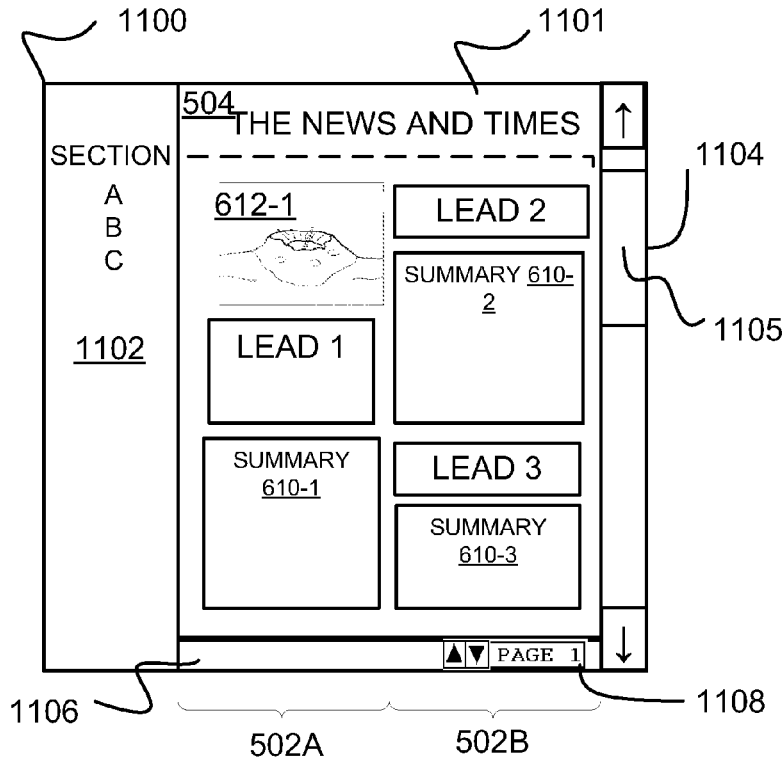
FIGS. 11A and 11B illustrate an exemplary user interface displaying content using a layout specifying two pages.
Figure 11B:
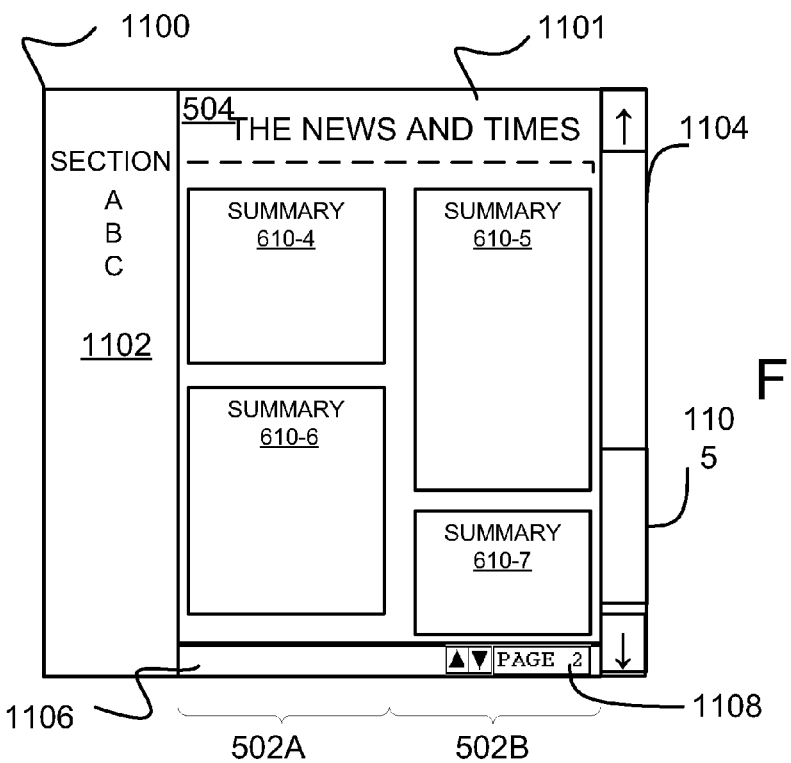

As was noted above, design rules can specify how content units will be placed into a layout under different circumstances. FIGS. 11A and 11B are provided to illustrate an exemplary user interface displaying the same content of FIG. 6, but using a different layout. Specifically, in this example, user interface 1100 comprises display area 1101, section selection area 1102, scrollbar 1104 with thumb 1105, and footer 1106 including a page interface 1108. Scrollbar 1104, thumb 1105, and page interface 1108 may be used in changing which page is shown in display area in response to user gestures such as clicking on the scrollbar track or moving the scrollbar thumb.

In some embodiments, the user interface module may be configured to support an advanced scrollbar that is rendered by user interface module 308/408 based on a scrollbar definition, with the scrollbar definition updated when changes to the size of the display area change the number of pages of the layout. Additional details regarding exemplary dynamic layout techniques that may be implemented by a user interface module or other component(s) that provide a scrollbar can be found in U.S. patent application Ser. No. 12/325,337 by Justin Van Slembrouck, titled "METHODS AND SYSTEMS FOR PAGE NAVIGATION OF DYNAMICALLY LAID-OUT CONTENT", which is filed on the same date as the present specification, and which is hereby incorporated in reference in its entirety.

In this example, FIG. 11A illustrates a first page "Page 1" while FIG. 11B illustrates a second page "Page 2." Page 1 includes lead story summary 610-1 and headline ("Lead 1"), second story summary 610-2 and headline ("Lead 2"), and third story summary 610-3 and headline ("Lead 3"). However, in contrast to FIG. 6, in this example display area 1101 comprises two columns 502A and 502B rather than four columns. Accordingly, a different layout has been generated from the layout used to render the content in the example of FIG. 6.

Particularly, only the lead story includes an image (612-1) and the image spans a single column (502A). Additionally, article summaries 610-4, 610-5, and 610-6 that appeared on the page shown in FIG. 6 have been allocated space on a second page in this example. As shown in FIG. 11B, in this example a layout strategy for the second page does not provide for any additional images. However, sufficient space remains on the second page for a seventh story summary 610-7 to be displayed alongside summaries 610-4, 610-5, and 610-6.

Figure 12:
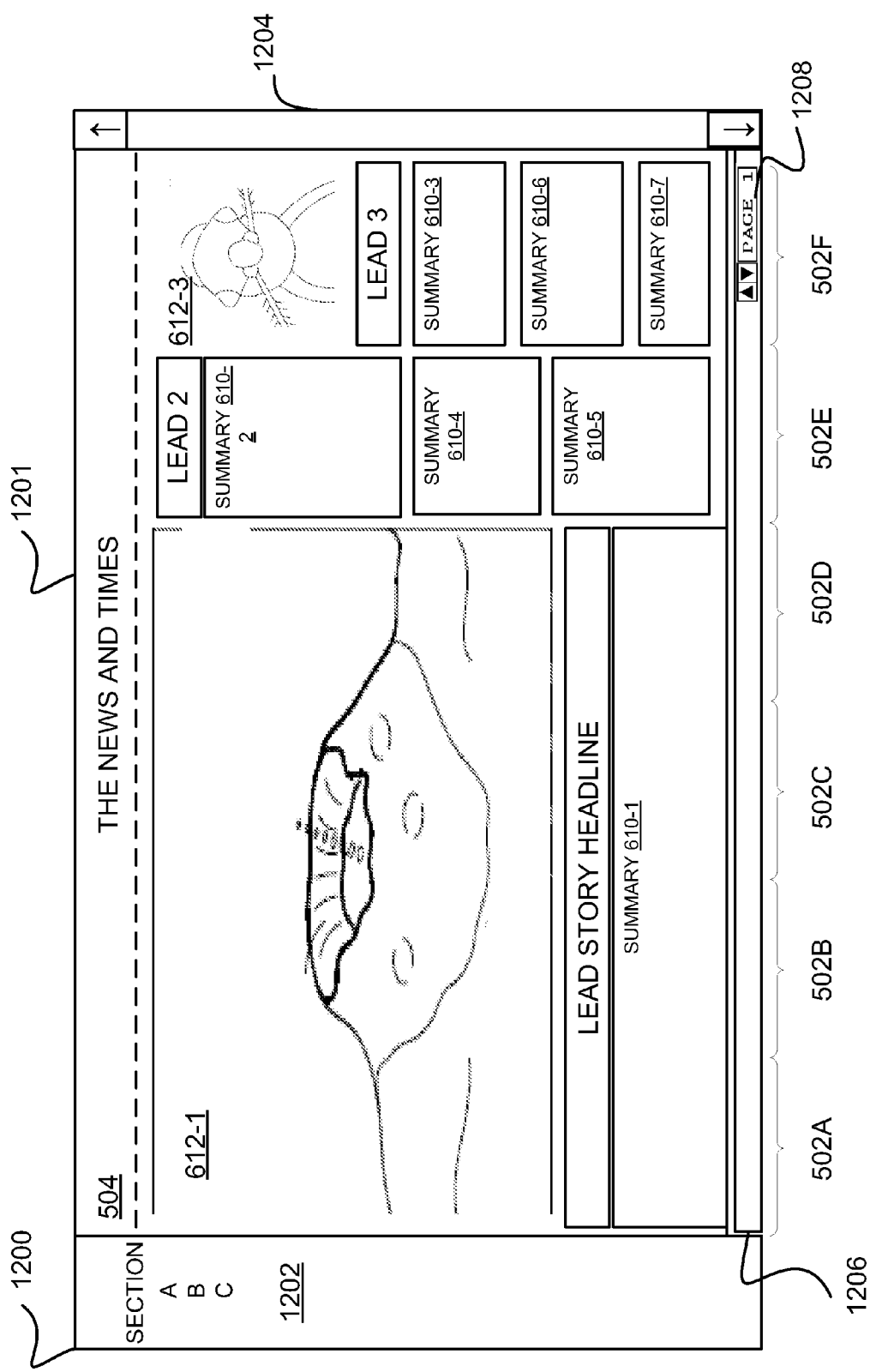
FIG. 12 illustrates an exemplary user interface displaying content in larger display area than FIG. 6, 11A, or 11B.

FIG. 12 illustrates an exemplary user interface displaying content in larger display area than FIG. 6, 11A, or 11B. In this example, display area 1201 includes six columns 502A-502F. Lead story summary 610-1, its headline, and accompanying image 612-4 span four columns (502A-502D). This example uses the design rules noted in the example above for in that an image 612-3 for summary 610-3 is provided, but no image for second lead story 610-2 is provided. In contrast to FIGS. 6, 11A, and 11B, in this example the initial page includes sufficient display area for displaying summaries 610-1 through 610-7 on the same page. FIG. 12 also includes a scrollbar 1204, footer 1206, and pagination interface 1208. In this example, the user interface module has not rendered a thumb in scrollbar 1204 since all content is included on a single page.

Figure 13:
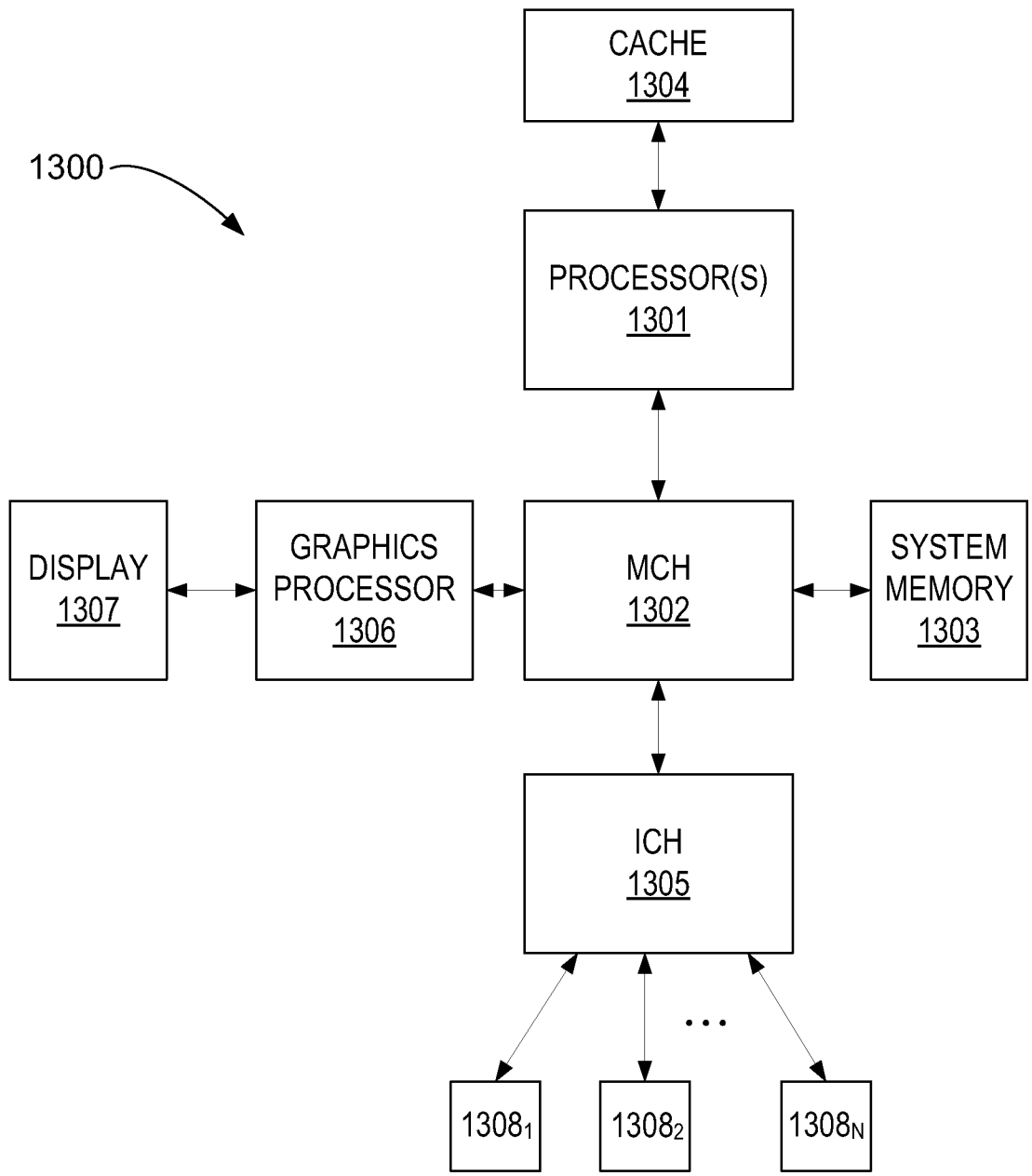
FIG. 13 is a block diagram illustrating components of an exemplary computing device.

FIG. 13 illustrates an example of computing device 1300 suitable for implementing embodiments of the methods and systems as described in the examples above. For example, system 200 of FIG. 2 may be constructed in accordance with FIG. 13. The exemplary computing system of FIG. 13 includes: 1) one or more processors 1301; 2) a memory control hub (MCH) 1302; 3) a system memory 1303 (of which different types exist such as DDR RAM, EDO RAM, etc,); 4) a cache 1304; 5) an I/O control hub (ICH) 1305; 6) a graphics processor 1306; 7) a display/screen 1307 (of which different types exist such as Cathode Ray Tube (CRT), Thin Film Transistor (TFT), Liquid Crystal Display (LCD), DPL, etc.); and/or 8) one or more I/O devices 1308.

The one or more processors 1301 execute instructions in order to perform whatever software routines the computing system implements. The instructions frequently involve some sort of operation performed upon data. For example, the instructions may cause a user interface module, layout manager, and data access/file manager to be operative to receive input, access data defining content items, generate a layout, and provide the layout for display.

Both data and instructions are stored in system memory 1303 and cache 1304. Cache 1304 is typically designed to have shorter latency times than system memory 1303. For example, cache 1304 might be integrated onto the same silicon chip(s) as the processor(s) and/or constructed with faster SRAM cells while system memory 1303 might be constructed with slower DRAM cells. By tending to store more frequently used instructions and data in the cache 1304 as opposed to the system memory 1303, the overall performance efficiency of the computing system improves.

System memory 1303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1303 prior to their being operated upon by the one or more processor(s) 1301 in the implementation of a software program. Similarly, data that a software program determines should be sent from the computing system to an outside entity through one of the computing system interfaces, or stored into an internal storage element, is often temporarily queued in system memory 1303 prior to its being transmitted or stored.

The ICH 1305 is responsible for ensuring that such data is properly passed between the system memory 1303 and its appropriate corresponding computing system interface (and internal storage device if the computing system is so designed). The MCH 1302 is responsible for managing the various contending requests for system memory 1303 access amongst the processor(s) 1301, interfaces and internal storage elements that may proximately arise in time with respect to one another.

One or more I/O devices 1308 are also implemented in a typical computing system. I/O devices generally are responsible for transferring data to and/or from the computing system (e.g., a networking adapter); or, for large scale non-volatile storage within the computing system (e.g., hard disk drive). ICH 1305 has bi-directional point-to-point links between itself and the observed I/O devices 1308.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method comprising:
accessing, by a display application executed by a processor, a data feed identifying a first plurality of content units and a second plurality of content units to be displayed;
determining, by the display application, a first priority for the first plurality of content units and a second priority for the second plurality of content units, wherein the first priority is higher than the second priority;
generating, by the display application, a layout specifying positions in a page for the first plurality of content units and the second plurality of content units, the page of the layout having a page size corresponding to a display area size for a display area, wherein generating the layout comprises:
identifying a first design rule specifying a first placement of content units corresponding to the first priority and a second design rule specifying a second placement of content units corresponding to the second priority, and
positioning the first plurality of content units based on the first design rule, and
positioning the second plurality of content units differently from the first plurality of content units based on the second design rule; and
outputting, by the display application, data for rendering the first plurality of content units and the second plurality of content units in the display area based on the layout;
wherein generating the layout further comprises:
determining, by the display application, that at least one of the first plurality of content units and the second plurality of content units comprises at least one text object associated with at least one image object;
determining, by the display application, that the first design rule or the second design rule further specifies that image objects are to be omitted for the display area having the display area size; and
excluding, by the display application, the at least one image object from the at least one of the first plurality of content units and the second plurality of content units to be displayed.

2. A method comprising:
receiving, by a reader application executed by a processor, at least one primary article and at least one secondary article to be displayed via the reader application, wherein the at least one primary article comprises a first plurality of content units and the at least one secondary article comprises a second plurality of content units;
determining, by the reader application, a first placement for each of the first plurality of content units based on a first design rule specifying placement of content units associated with primary articles;
determining, by the reader application, a second placement for at least one secondary content unit of the second plurality of content units based on a second design rule specifying placement of content units associated with secondary articles; and
generating, by the reader application, a layout for displaying the at least one primary article and at least some of the at least one secondary article in a display area, wherein generating the layout comprises placing each of the first plurality of content units based on the first design rule and placing the at least one secondary content unit based on the second design rule;
wherein the first plurality of units includes a first image for the at least one primary article and the second plurality of units includes a second image for the at least one secondary article and wherein determining the second placement for each of the second plurality of content units based on the second design rule comprises:
determining that the first plurality of units includes the first image for the at least one primary article; and
excluding the second image from the layout based on the second design rule specifying that images for secondary articles are to be included in the layout if no images are associated with primary articles.

* * * * *